US007367441B2

(12) United States Patent
Mustalahti et al.

(10) Patent No.: US 7,367,441 B2
(45) Date of Patent: May 6, 2008

(54) TRAVELATOR

(75) Inventors: Jorma Mustalahti, Hyvinkää (FI); Esko Aulanko, Kerava (FI)

(73) Assignee: KONE Corporation, Helsinki (FI)

( * ) Notice: Subject to any disclaimer, the term of this patent is extended or adjusted under 35 U.S.C. 154(b) by 0 days.

(21) Appl. No.: 11/630,358

(22) PCT Filed: May 18, 2005

(86) PCT No.: PCT/FI2005/000226

§ 371 (c)(1), (2), (4) Date: Dec. 21, 2006

(87) PCT Pub. No.: WO2006/003237

PCT Pub. Date: Jan. 12, 2006

(65) Prior Publication Data

US 2008/0029364 A1 Feb. 7, 2008

(30) Foreign Application Priority Data

Jun. 30, 2004 (FI) .................................. 20040908

(51) Int. Cl.
*B65G 15/00* (2006.01)

(52) U.S. Cl. ...................................................... 198/325

(58) Field of Classification Search ................ 198/324, 198/325

See application file for complete search history.

(56) References Cited

U.S. PATENT DOCUMENTS 3,071,234 A 1/1963 Moore et al.
3,592,139 A 7/1971 Patin
5,044,485 A * 9/1991 Loder .......................... 198/325
5,971,129 A 10/1999 Stawniak et al.
6,068,107 A * 5/2000 Brun-Jarret .................. 198/325
6,341,683 B1 * 1/2002 Hattori et al. .............. 198/325

FOREIGN PATENT DOCUMENTS

JP 2003-20181 2/2003

OTHER PUBLICATIONS

International Search Report and Written Opinion (Feb. 14, 2006), PCT/FI2005/000226, filed May 18, 2005.

* cited by examiner

*Primary Examiner*—James R Bidwell
(74) *Attorney, Agent, or Firm*—Venable LLP; Robert Kinberg; Ryan M. Flandro

(57) ABSTRACT

A travelator conveyor is arranged such that an upper surface of a comb plate is at substantially the same level as a conveying surface. The conveyor includes a plurality of belt drums arranged parallel to one another transversely to a transport direction of the conveyor and a plurality of mutually parallel endless belt loops passing over the plurality of belt drums to define a moving conveying surface. The conveyor comb plate has a plurality of parallel spaced teeth between which some of the plurality of belt loops are arranged to pass. An upper surface of a first belt drum arranged at the end of the conveyor is at a lower level than an upper surface of a second belt drum such that upper portions of the belt loops passing between the comb plate teeth extend at an inclined angle with respect to the conveying surface.

7 Claims, 1 Drawing Sheet

TRAVELATOR

CROSS REFERENCE TO RELATED APPLICATIONS

This application is a National Stage Application of International Application No. PCT/FI2005/000226, filed May 18, 2005, which claims the priority benefit of Application No. FI20040908, filed in Finland on Jun. 30, 2004. The disclosures of the above-referenced applications are expressly incorporated herein by reference together with each U.S. and foreign patent and patent application mentioned below.

BACKGROUND OF THE INVENTION

1. Field of the Invention

The present invention relates to a travelator conveyor for transporting passengers.

2. Related Art

Travelators intended for transporting people are known e.g. from the following patent documents: Japanese patent document JP 2003-20181, U.S. Pat. No. 1,689,201, U.S. Pat. No. 2,769,522, and U.S. Pat. No. 3,592,139. In these, the conveyor includes a large number of adjacent narrow belt loops, several such belt loops being arranged over the width of the conveyor to transport users of the travelator. The conveyor has a number of belt drums arranged parallel to each other, at a distance from each other and transverse to the trans-port direction of the conveyor. Each belt drum carries a number of belt pulleys placed side by side. In the following, the belt drum at the end of the conveyor is called the first belt drum. Placed next to it is a second belt drum. 'Third belt drum' here refers to one of the following belt drums adjacent to the second belt drum. Further, the conveyor comprises a number of mutually parallel endless belt loops, whose upper portions between the belt drums form the moving conveying surface of the conveyor. The belt loops in the end area of the conveyor comprise a number of first belt loops, which are passed over the first belt drum and the second belt drum. A number of second belt loops are passed over the second belt drum and the third belt drum so that they are interleaved with the first belt loops. From the second belt drum onwards over the length of the conveyor, the mutual arrangement of the belt loops is so implemented that they are interlaced with respect to each other in a comb-like fashion around each belt drum. Each belt loop is passed over two belt pulleys on two successive belt drums. Of each two closely adjacent belt loops on the same common belt drum that are passed over adjacent belt pulleys, one belt loop is passed over a belt pulley on the previous belt drum adjacent to the common belt drum while the other belt loop adjacent to the aforesaid belt loop is passed over a belt pulley on one of the following belt drums relative to the aforesaid common belt drums. The belt loops may be arranged to transmit power, or the power transmission may be implemented via external power transfer to the belt drums.

A comb plate is provided in the immediate vicinity of the end of the conveyor. The comb plate has a number of teeth substantially parallel to each other and spaced by a distance, the first belt loops being fitted to pass between these teeth. Moreover, the comb plate has an upper surface serving as a fixed step surface. A known solution is to place the comb plate immediately beside the first belt drum. A problem with this solution is that at the end of the conveyor between the first and the second belt drums there are first belts spaced so that between each two adjacent belts there remains a gap of a width at least equal to the belt width. For example, if the distance between belt drums is 150 mm and the belt width is 10 mm, gaps of 10 mm×150 mm are formed, which may cause harm when foreign objects get into the gaps. In addition, the upper surface of the comb plate is necessarily at a higher level than the conveying surface of the conveyor, so they have between them a threshold that the passenger may trip on.

SUMMARY

An object of the present invention is to overcome the above-mentioned drawbacks.

Another object of the invention is to disclose a travelator which is safer than earlier travelators and in which the comb plate can be so arranged that the above-mentioned gaps cause no harm and whose upper surface can be at the same level as the conveying surface of the conveyor, thus minimizing the risk of tripping and falling.

Example embodiments of the invention are presented in the following description and drawings of the present application. The example inventive content disclosed in the application can also be defined in other ways than is done in the claims below. The example inventive content may also include several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

According to an embodiment of the invention, an upper surface of a first belt drum of a travelator conveyor is at a lower level than an upper surface of a second belt drum of the travelator conveyor so that upper portions of first belt loops arranged around the first and second belt drums are at an inclined angle. The comb plate is so disposed on the first belt drum that teeth of the comb plate extend to a substantially close distance from the second belt loops running over the second belt drum.

In another embodiment of the travelator, the upper surface of the comb plate is substantially at the same level with the conveying surface of the conveyor.

In yet another embodiment of the travelator, a first axis of rotation of the of the first belt drum is at the same level or at a lower level relative to the level of a second axis of rotation of the second belt drum and a third axis of rotation of the third belt drum.

In yet another embodiment of the travelator, a diameter of the first belt drum is smaller than a diameter of the second belt drum.

In still another embodiment of the travelator, the diameter of the first belt drum is substantially equal to the diameter of the second belt drum.

In still another embodiment of the travelator, an end of the conveyor is an entry end or leading end as seen in the transport direction. In this case, the first belt drum is also the first one of the belt drums in the transport direction.

In still another embodiment of the travelator, the end of the conveyor is an exit end or tailing end as seen in the transport direction. In this case, the first belt drum is the last one of the belt drums of the conveyor in the trans-port direction.

BRIEF DESCRIPTION OF THE DRAWINGS

Aspects of the invention will now be described by way of example only with reference to the accompanying drawings in which.

DETAILED DESCRIPTION

Figure 1:
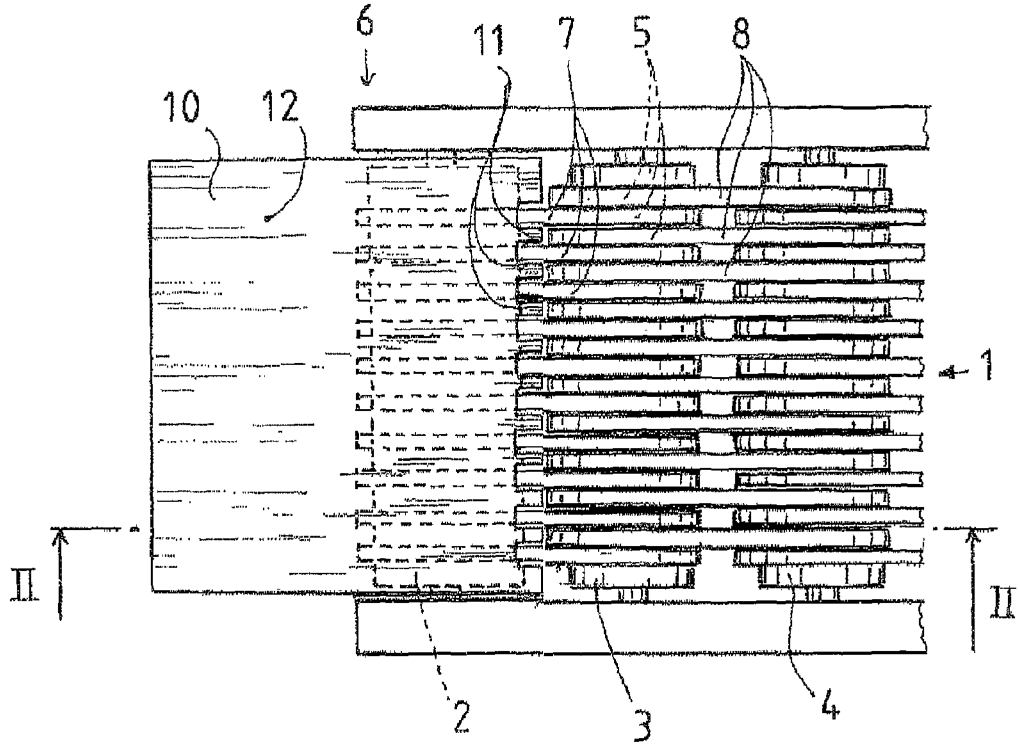
FIG. 1 depicts a diagrammatic top view of an end of the conveyor of a travelator according to an example embodiment of the invention.

FIG. 1 depicts a diagrammatic top view of an end of the conveyor of a travelator according to an example embodiment of the invention. Depending on the transport direction, the conveyor end 6 may be the entry end or leading end, or just as well the exit end or trailing end.

The conveyor 1 comprises a plurality of belt drums 2, 3, 4 rotatably mounted with bearings on a conveyor frame of the travelator. The belt drums 2, 3, 4 are arranged to be mutually parallel, at a distance from each other and transverse to the transport direction of the conveyor 1. Each belt drum 2, 3, 4 carries a plurality of belt pulleys 5. The belt drums visible in FIG. 1 comprise a first belt drum 2 at the end 6 of the conveyor, a second belt drum 3, which is the one next to the first belt drum 2, and a third belt drum 4, which is one of the following belt drums adjacent to the second belt drum.

Furthermore, the conveyor 1 has a plurality of mutually parallel endless belt loops 7, 8, the upper portions of which between belt drums 2 and 3, and 3 and 4, form a conveying surface 9. The belt loops comprise a plurality of first belt loops 7, which are passed over the first belt drum 2 and the second belt drum 3. In addition, the belt loops comprise a plurality of second belt loops 8, which are passed over the second belt drum 3 and the third belt drum 4 so that they are interleaved with the first belt loops 7.

Although the example illustrations show the second belt loop 8 as passing over two immediately successive belt drums 3 and 4, it is of course possible to provide longer belt loops 8 the passage of which is so arranged that between the belt drums turning the belts around through 180° there are one or more supporting drums over whose belt pulleys the belts run substantially straight without their direction being changed, so these drums are only intended to support the belts from below.

The conveyor further comprises a comb plate 10 arranged in the immediate vicinity of the end 6 of the conveyor and having a plurality of teeth 11 substantially parallel to each other and spaced by a distance, the first belt loops 7 being fitted to pass between these teeth. The comb plate 10 is designed to prevent dirt, passengers' limbs and other objects from getting into the gaps between the moving belts and the fixed structures. The comb plate 10 has an upper surface 12 that the passenger can step on.

Figure 2:
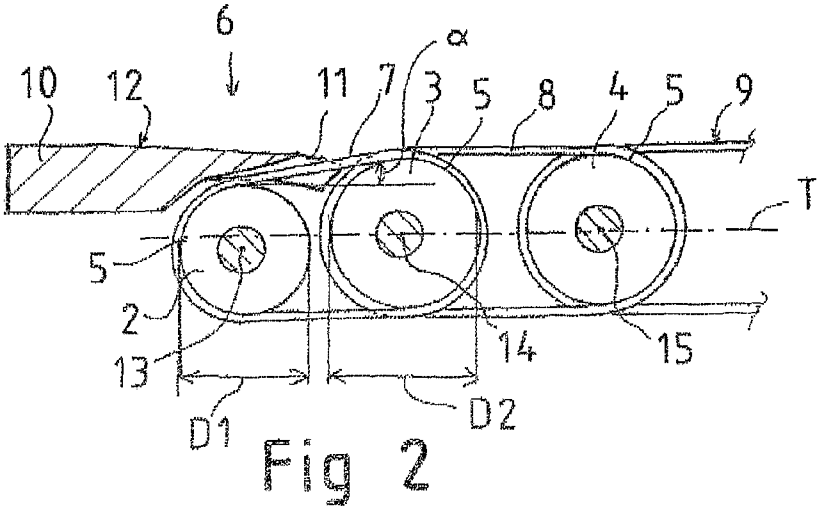
FIG. 2 depicts a cross-section II-II from FIG. 1.

FIG. 2 shows that the upper surface of the first belt drum 2 is at a lower level than the upper surface of the second belt drum 3, so the upper portions of the first belt loops 7 are at an inclined angle α relative to the horizontal plane. This allows the comb plate 10 to be extended over the first belt drum 2 so that the teeth 11 of the comb plate 10 extend substantially close to the second belt loops 8 running over the second belt drum 3. This makes it possible for the upper surface 12 of the comb plate 10 to be disposed substantially at the same level with the conveying surface 9 of the conveyor 1.

The diameter D1 of the first belt drum 2 is smaller than the diameter D2 of the second belt drum 3. The first axis of rotation 13 of the first belt drum 2 is at a somewhat lower level relative to plane T, which is the plane at which the second axis of rotation 14 of the second belt drum 3 and the third axis of rotation 15 of the third belt drum 4 are located.

In another embodiment the diameter D1 of the first belt drum 2 may also be substantially equal to the diameter D2 of the second belt drum 3. In this case, the first belt drum 2 may be placed at a level still lower at a distance below plane T so that the upper portion of the first belt loop 7 will be placed at an inclined angle α.

The invention is not limited to the example embodiments described above; instead, many variations are possible within the scope of the inventive concept defined in the claims.

The invention claimed is:

1. A travelator conveyor for transporting passengers in a transport direction, the conveyor comprising:

a first belt drum disposed at an end of the conveyor and defining a first rotational axis;

a second belt drum disposed at a distance from the first belt drum in the transport direction and defining a second rotational axis; and a third belt drum disposed at a distance from the second belt drum in the transport direction and defining a third rotational axis, wherein the first, second, and third rotational axes are parallel to one another and extend transversely to the transport direction of the conveyor, and wherein each of the first, second, and third belt drums include a plurality of belt pulleys arranged thereon;

a plurality of mutually parallel endless belt loops passing over at least one of the first, second, and third belt drums and having upper portions extending between the belt drums to define a moving conveying surface of the conveyor, wherein the plurality of mutually parallel endless belt loops comprise a plurality of first belt loops passed over the first belt drum and the second belt drum and a plurality of second belt loops passed over the second belt drum and the third belt drum, the plurality of first belt loops and the plurality of second belt loops being interleaved with one another on the second belt drum; and a comb plate arranged at the end of the conveyor and having a plurality of spaced teeth extending substantially parallel to each other in the transport direction, wherein the first belt loops are arranged to pass between the teeth, and wherein an upper surface of the first belt drum is at a lower level than an upper surface of the second belt drum such that the upper portions of the first belt loops are at an inclined angle relative to the upper portions of the second belt loops and the teeth of the comb plate extend substantially close to the second belt loops passing over the second belt drum.

2. The travelator conveyor according to claim 1, wherein an upper surface of the comb plate is substantially at the same level with the conveying surface of the conveyor.

3. The travelator conveyor according to claim 1, wherein the first axis of rotation is disposed at the same level or at a lower level relative to a plane (T) defined by the second axis of rotation and the third axis of rotation.

4. The travelator conveyor according to claim 1, wherein the diameter of the first belt drum is smaller than the diameter of the second belt drum.

5. The travelator conveyor according to claim 1, wherein the diameter of the first belt drum is substantially equal to the diameter of the second belt drum.

6. The travelator conveyor according to claim 1, wherein the end of the conveyor is an entry end as seen in the transport direction.

7. The travelator conveyor according to claim 1, wherein the end of the conveyor is an exit end as seen in the transport direction.

* * * * *